United States Patent
Hammerich et al.

(10) Patent No.: US 7,584,457 B2
(45) Date of Patent: Sep. 1, 2009

(54) VALIDATING PROGRAMS

(75) Inventors: Reiner Hammerich, Rauenberg (DE);
Werner Baechle, Mannheim (DE);
Thorsten Dencker, Ludwigshafen (DE);
Ulf Fildebrandt, Schwetzingen (DE);
Josef Dietl, Nussloch (DE)

(73) Assignee: SAP AG, Walldorf (DE)

( * ) Notice: Subject to any disclaimer, the term of this patent is extended or adjusted under 35 U.S.C. 154(b) by 585 days.

(21) Appl. No.: 10/676,825

(22) Filed: Sep. 30, 2003

(65) Prior Publication Data
US 2004/0123273 A1 Jun. 24, 2004

(30) Foreign Application Priority Data
Oct. 1, 2002 (EP) ................. 02022042

(51) Int. Cl.
*G06F 9/44* (2006.01)
*G06F 9/45* (2006.01)
(52) U.S. Cl. .............. 717/126; 717/115; 717/116; 717/136
(58) Field of Classification Search ......... 717/108, 717/147; 715/510
See application file for complete search history.

(56) References Cited

U.S. PATENT DOCUMENTS

| | | | | |
|---|---|---|---|---|
| 6,066,181 | A * | 5/2000 | DeMaster | 717/148 |
| 6,886,157 | B2 * | 4/2005 | Long et al. | 717/151 |
| 6,941,520 | B1 * | 9/2005 | Lewallen | 715/762 |
| 7,051,316 | B2 * | 5/2006 | Charisius et al. | 717/103 |
| 2003/0007009 | A1 * | 1/2003 | Haley | 345/805 |
| 2003/0182625 | A1 * | 9/2003 | Davidov et al. | 715/513 |
| 2004/0015840 | A1 * | 1/2004 | Walker | 717/108 |

OTHER PUBLICATIONS

"Mobile Information Device Profile JSR-37 Specification", Dec. 15, 2000, Chapters 1-9 extracted (70 pages). Online retrieved at <java.sun.com/products/midp>.*
"Java and XML Data Binding", May 2002, Safari Books Online.*
"A reusable graphical user interface for manipulating object-oriented databases using Java and XML", Dietrich et al., Dec. 2001, pp. 362-366. Online retrieved at <http://delivery.acm.org/10.1145/370000/364712/p362-dietrich.pdf>.*
"A Java-based framework to support computer-assisted creation of structured XML documents", A. Trentini, Jun. 2002, pp. 48-53. Online retrieved at <http://delivery.acm.org/10.1145/570000/568245/p48-trentini.pdf>.*
Abrams, Mark, et al., "UIML: An XML Language for Building Device-Independent User Interfaces," Dec. 1999, retrieved from the Internet on May 17, 2004, at http://www.harmonia.com/resources/papers/xml99Final.pdf, XP002280477, 15 pgs.

(Continued)

*Primary Examiner*—Tuan Q Dam
*Assistant Examiner*—Thuy Dao
(74) *Attorney, Agent, or Firm*—Finnegan, Henderson, Farabow, Garrett & Dunner L.L.P.

(57) ABSTRACT

Methods and apparatus, including computer program products implement techniques for validating programs. A language-independent description of a computer program is received, and the language-independent description is validated. The language-independent description includes a definition module and an implementation module. A language-dependent program is generated from the language-independent description, where the language-dependent program includes an interface and a class, and the language-dependent program is validated.

9 Claims, 6 Drawing Sheets

OTHER PUBLICATIONS

Abrams, Marc, et al., "User Interface Markup Language (UIML) Specification, Version 3.0," Feb. 8, 2002, retrieved from the Internet on May 18, 2002, at http://www.uiml.org/specs/docs/uim130-revised02-12-02.pdf, XP002280679, 116 pgs.

Ali, Mir Farooq, et al., "Building Multi-Platform User Interfaces with UML," Nov. 9, 2001, retrieved from the Internet on May 17, 2004, at http://arxiv.org/ftp/cs/papers/0111/0111024.pdf, XP002280476, XP002280477, XP002280490, 12 pgs.

"Computer Science, abstract," Arxiv.org E-Print Archive, retrieved from the Internet on May 17, 2004, at http://arxiv.org/abs/cs.HC/0111024, XP002280478, 1 pg.

Kagle, Kurt, et al., "Professional XSL," 2001, Wrox Press Ltd., Arden House, Birmingham, UK, XP002281359, p. 742.

Levine, John R., "Linkers & Loaders," 2000, Morgan Kaufmann Publishers, San Francisco, CA, XP002283283, p. 48.

Phanouriou, Constantinos, "UIML: A Device-Independent User Interface Markup Language," Virginia Polytechnic Institute and State University, Sep. 26, 2000, retrieved from the Internet on May 17, 2004, at http://scholar.lib.vt.edu/theses/available/etd-08122000-19510051/unrestricted/PhanouriouETD.pdf, XP002280491, 172 pgs.

Phanouriou, Constantinos, "User Interface Markup Language (UIML) Draft Specification, Version 2.0a," Jan. 17, 2000, retrieved from the Internet on May 17, 2004, at http://www.uiml.org/specs/docs/uim120-17Jan00.pdf, XP002280490, 64 pgs.

* cited by examiner

VALIDATING PROGRAMS

CROSS-REFERENCE TO RELATED APPLICATIONS

This application claims the benefit of priority to European application serial no. 02022042.2, filed Oct. 1, 2002.

BACKGROUND

The present invention relates to data processing by digital computer, and more particularly to the validation of computer program applications.

A computer program application can include a computer program implemented in a compiler language, e.g., an object oriented programming language. Definition modules and implementation modules can be used to describe a computer program implemented in a compiler language. The implementation modules and definition modules can be stored in files of distinct types. In some object oriented programming languages, the definition modules are called interfaces and the implementation modules are called classes.

The two-component, definition-implementation model aids program verification by allowing early detection of some programming errors. The definition modules or interfaces can be viewed as a record of promises given by a class (the provider class). This record can be used to detect certain programming errors, e.g., where a second class (the customer class) relies on or attempts to use features of the provider class that have not been promised by the provider class. Interface modules can also be used to verify that the implementation of a provider class provides all the promised features.

Some computer program applications include script code sections. Script code sections can be implemented using an interpreted or scripting language, e.g., JavaScript or Perl. For purposes of this specification, a scripting language is a language that does not support interfaces and that is either weakly typed or untyped. Scripting languages can interact with other programs or with a set of functions provided by an interpreter for the scripting language, as with the file system functions provided in a UNIX shell. Because scripting languages do not support the definition-implementation model, it is difficult to detect errors in script code sections before runtime.

SUMMARY OF THE INVENTION

In general, in one aspect, the invention provides methods and apparatus, including computer program products, for the validation of computer program applications. The techniques include receiving the language-independent description of a computer program, while editing the language-independent description, generating a language-dependent program from the language-independent description, and validating the language-dependent program. The language-independent description includes a definition module and an implementation module. The language-dependent program includes an interface and a class.

Advantageous implementations of the invention include one or more of the following features. Validating the language-independent description can include validating the syntax of the definition module and the implementation module. Validating the language-dependent program can include compiling the interface and the class. The definition module and the implementation module can be represented in a meta-language or using a tree structure.

In another aspect, the invention provides methods and apparatus implementing techniques for the validation of programs including receiving a language-independent description of a computer program, validating the language-independent description, generating a language-dependent program from the language-independent description, and validating the language-dependent program. The language-independent description can include a definition module and an implementation module. The language-dependent program can include a script code section.

Advantageous implementations of the invention include one or more of the following features. Validating the language-dependent program can include extracting language elements from the script code section, and comparing the extracted language elements with the definition module. Extracting language elements can include generating a symbol table from the script code section. Generating the language-dependent program can include generating language-dependent code comprising an interface and a class. Validating the language-dependent program can include extracting language elements from the script code section, comparing the extracted language elements with the definition module, generating language-dependent code comprising an interface and a class, and compiling the interface and the class.

In another aspect, the invention provides methods and apparatus implementing techniques for validating programs. The techniques include receiving a language-independent description of a computer program, where the language-independent description includes a definition module and an implementation module, and validating the language-independent description. A first language-dependent program is generated from the language-independent description where the first language-dependent program includes a first script code section. A second language-dependent program is generated from the language-dependent description, where the second language-dependent program includes a second script code section of a distinct second kind. A first set of language elements is extracted from the first script code section, a second set of language elements is extracted from the second script code section, and the first set of language elements and the second set of language elements are compared with the definition module.

The invention can be implemented to realize one or more of the following advantages. Computer applications can be validated independently of the specific language used to implement the applications. Computer applications can also be validated at an early stage in the validation cycle. Computer applications implemented using programming languages that do not support the concept of validation or the concept of classes and interfaces, can be validated.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
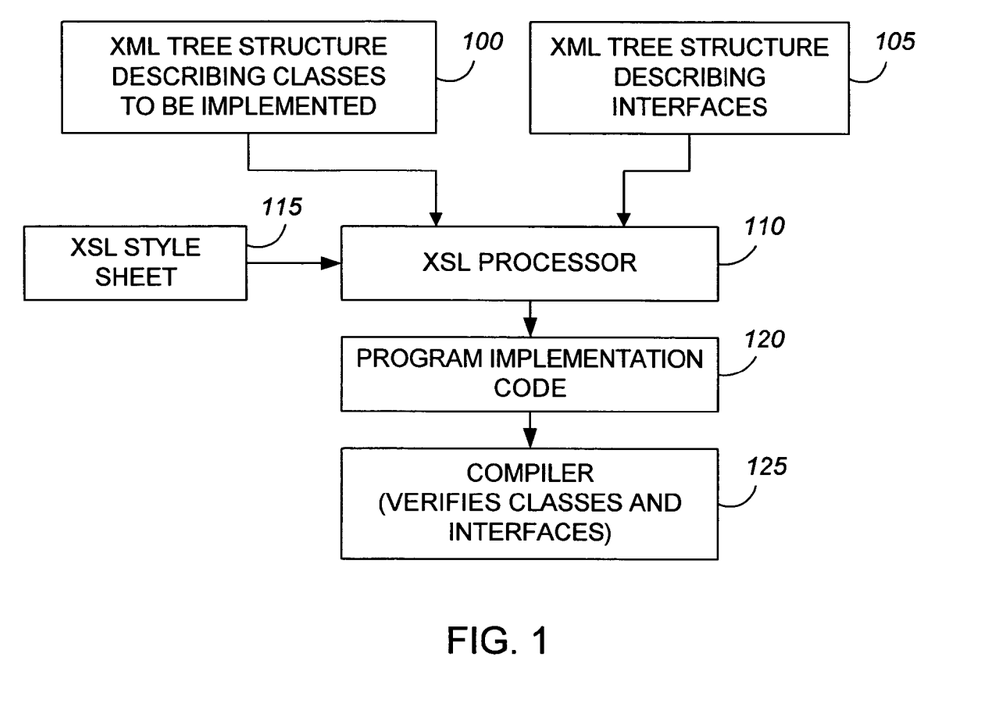
FIG. 1 illustrates the validation of a computer application having class and interface definitions.

As shown in FIG. 1, in one implementation of the invention, tree structures are used to represent a computer program. These representations are used to generate and validate one or more executable programs, as will be described. The representations can include a tree structure defining the implementation modules, in this particular case, classes to be implemented 100, and a tree structure defining the definition modules, in this particular case, the associated interfaces 105. It is advantageous to define the implementation modules and the definition modules using a language-independent representation. A language-independent representation is not restricted to any particular programming language used to implement an executable program. In one exemplary implementation, the implementation modules and the definition modules can be specified in a language that can be used as a meta-language, e.g., Extensible Markup Language (XML), Extended Backus-Naur Form (EBNF), Abstract Syntax Notation One (ASN.1), or LISP.

The XML descriptions of the interfaces and classes can be used to generate executable programs, for example, by using an Extensible Stylesheet Language (XSL) style sheet 115 in conjunction with an XSL processor 110 to generate program implementation code 120. The executable programs are language-dependent representations specific to a particular programming language used to implement the programs. XSL includes two parts: a language for transforming XML documents, and an XML vocabulary for specifying formatting semantics. An XSL style sheet specifies the presentation of a class of XML documents by describing how an instance of the class is transformed into an XML document that uses the formatting vocabulary. Other technologies, e.g., the Apache Velocity template engine, can be used in place of XSL.

The program described by the interfaces and classes can be validated at two levels. On the language-independent or XML level, a syntax check is performed for the interface description and the implementation class description. On the language-dependent level, to the extent that the generated implementation code can be compiled, the interface and class definitions can be validated by compiling the code. In this case, the compiler 125 verifies the class and interface definitions by performing usage and implementation checks. Usage checks verify that a customer class only uses interfaces that have been promised by a provider class. Implementation checks verify that the implementation of a provider class provides all the promised interfaces.

Figure 2:
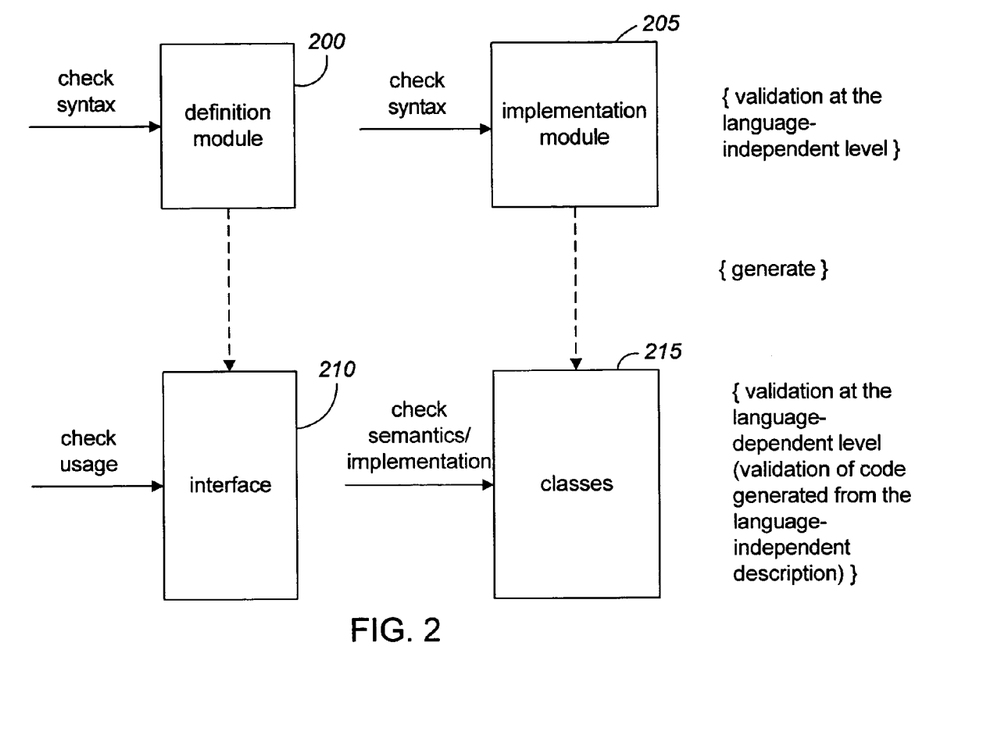
FIG. 2 is a conceptual block diagram illustrating the validation of a program at the language-independent level and the language-dependent level.

FIG. 2 is a conceptual block diagram illustrating the validation of a program at the language-independent level and the language-dependent level. As described above, a definition module 200 and an implementation module 205 representing the program are received. In one implementation, the computer program can be represented using more than one definition module 200 and/or more than one implementation module 205. The implementation module 205 defines the classes to be implemented by the program and the definition module 200 defines the associated interfaces. The validation at the language-independent level is performed as a syntax check for the definition module 200 and the implementation module 205. The implementation module 205 is used to generate the classes 215 and the definition module 200 is used to generate the associated interfaces 210. Language-dependent validation of the classes 215 and interfaces 210 generated from the language-independent descriptions can be performed by compiling the classes 215 and the interfaces 210 using a compiler 125. The compiler 125 verifies the class and interface definition by performing usage and implementation checks on the language-dependent representation of the classes 215 and the interfaces 210.

Figure 3A:
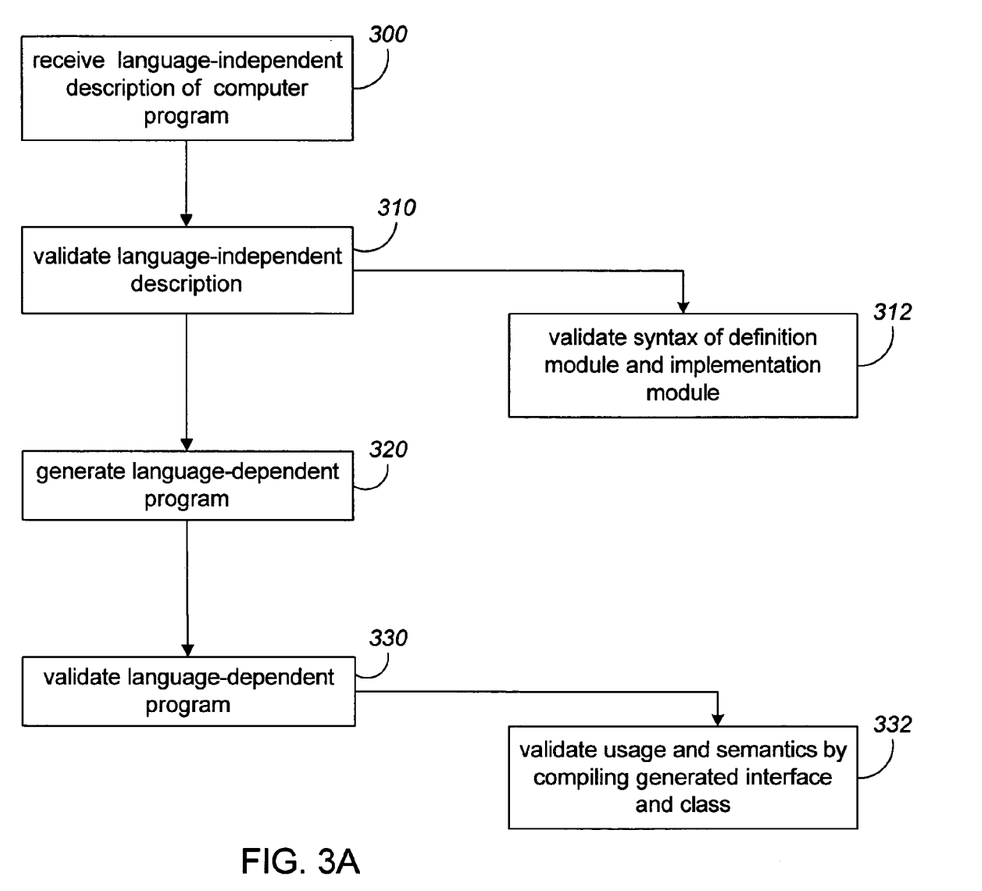
FIG. 3A is a flow diagram illustrating the validation of a computer program implemented using a compiler-language section.

FIG. 3A is a flow diagram illustrating the validation of a computer program implemented using a compiler-language section. A language-independent description of a computer program is received (step 300). As described above, the language-independent description can include implementation modules 205 and definition modules 200 describing the computer program. The language-independent description is validated (step 310) and a syntax check is performed for the implementation modules 205 and the definition modules 200 (step 312). The language-independent description is used to generate a language-dependent program (step 320), e.g., by generating a program implementation using a particular programming language. The language-dependent program is validated (step 330) and usage and semantics checks are performed by compiling the generated interfaces and classes (step 332).

Figure 3B:
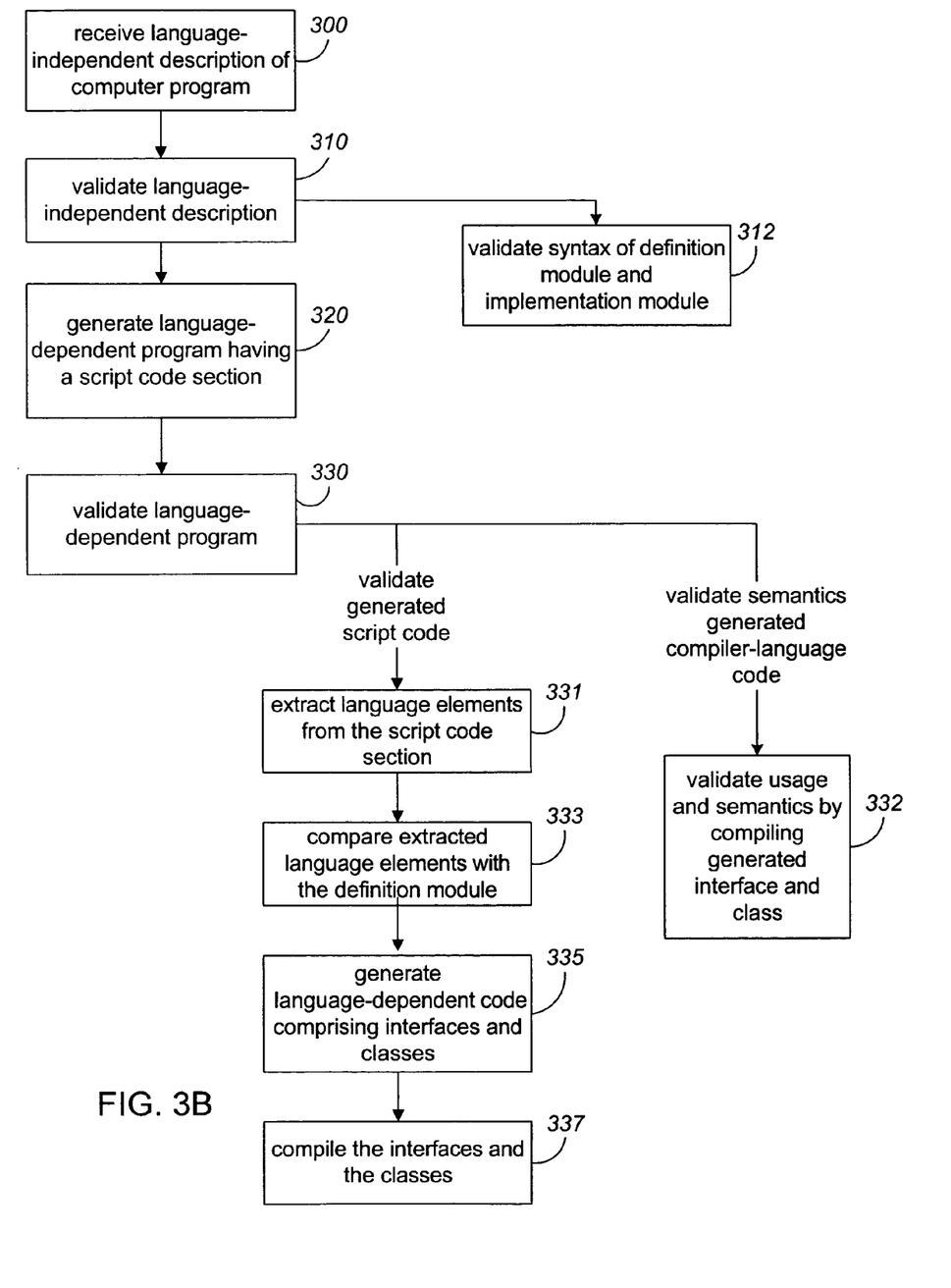
FIG. 3B is a flow diagram illustrating the validation of a computer program implemented using a compiler-language section and a script code section.

FIG. 3B is a flow diagram illustrating the validation of a computer program implemented using a compiler-language section and a script language section. As discussed above, a language-independent representation of a computer program is received (step 300), and the language-independent representation is validated (step 310) by performing a syntax check for the implementation modules 205 and definition modules 200 (step 312). A language-dependent representation of the program is generated (step 320), and the generated language-dependent representation is validated (step 330). The generated computer program includes a compiler-language section and a script code section. As described above, the validation of the generated compiler-language section includes usage and semantics checks performed by compiling the generated interfaces 210 and classes 215 (step 332). Usage check of the script code section is performed by extracting the language elements from the script code section (step 331), and comparing the extracted language elements with the definition module (step 333). In order to perform semantics check of the generated script code section, language-dependent code is generated in a language that supports classes and interfaces (step 335). The language-dependent representation for the script code section generated in step 335 implements classes and associated interfaces. Semantics check of the script code section is performed by compiling the generated interfaces 210 and the classes 215 (step 337).

Figure 4:
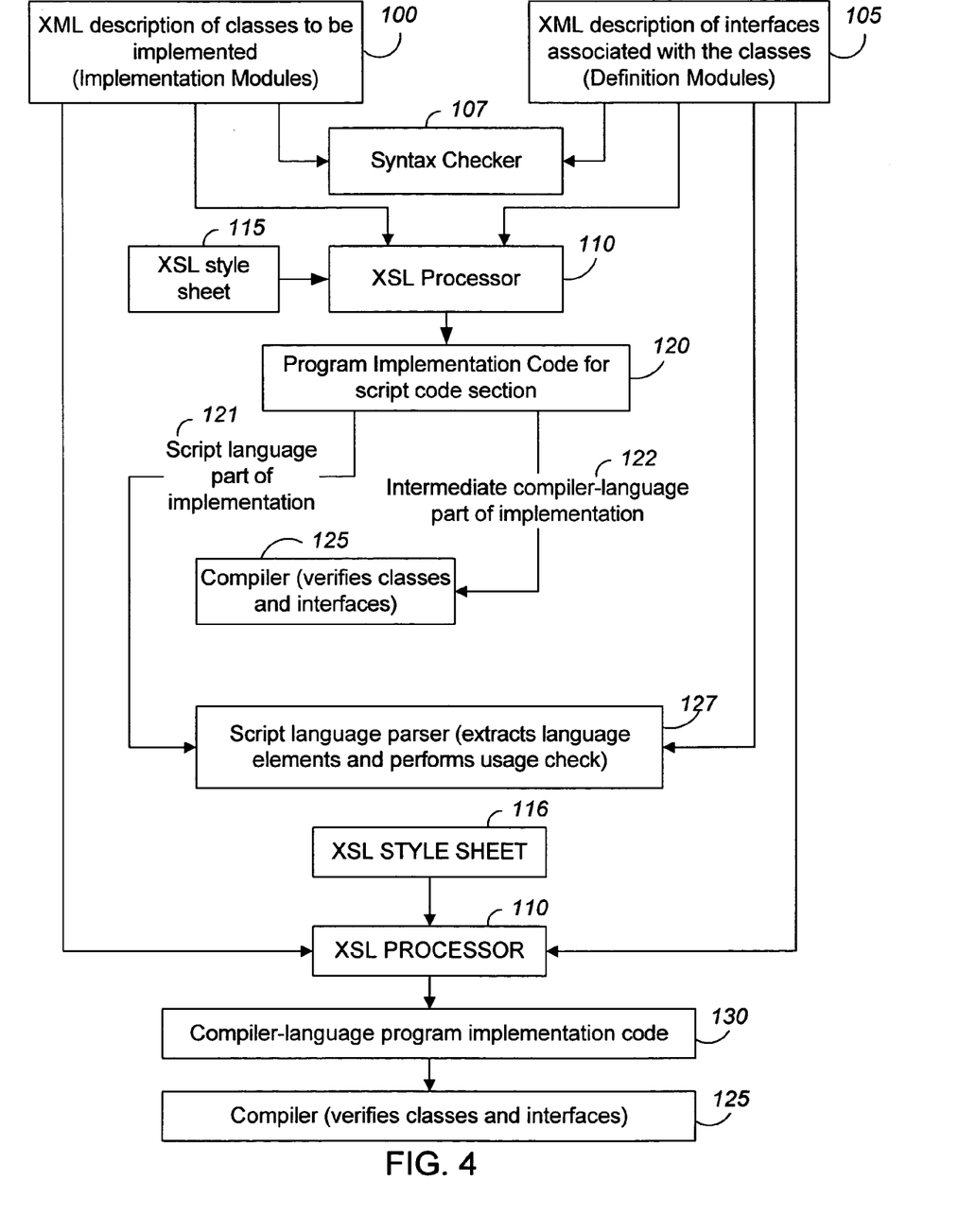
FIG. 4 illustrates the validation of a computer program having a compiler-language section and a script code section.

FIG. 4 illustrates the validation of a computer program having a compiler-language section and a script code section. The XML implementation modules 100 and definition modules 105 represent a computer program. A syntax checker 107 can be used to perform a syntax check at the XML level for the implementation modules 100 and the definition modules 105. Program implementation code for the script code section of the computer program 120 is generated from the implementation modules 100 and the definition modules 105 using an XSL processor 110 in conjunction with XSL style sheets 115. The program implementation code 120 includes a script code implementation of the computer program 121 in a scripting language, e.g., JavaScript or Perl. The program implementation code 120 also includes an implementation of the script code section in an intermediate compiler-language 122 that supports classes and interfaces. A compiler 125 is used to perform implementation checks on the compiler-language implementation of the script code section 122. If the script language generator works properly, the implementation checks performed by the compiler 125 can be used to conclude that the generated script language implementation 121 works accordingly. Usage checks are performed on the script language implementation 121 using a script language parser 127. The script language parser 127 performs usage checks by extracting language elements from the generated script language implementation 121 and comparing the language elements with the definition modules 105.

Program implementation code for the compiler-language portion of the computer program 130 is generated from the implementation modules 100 and the definition modules 105 using the XSL processor 110 in conjunction with XSL style sheets 116. The compiler 125 verifies the class and interface definitions by performing usage and implementation checks.

Figure 5:
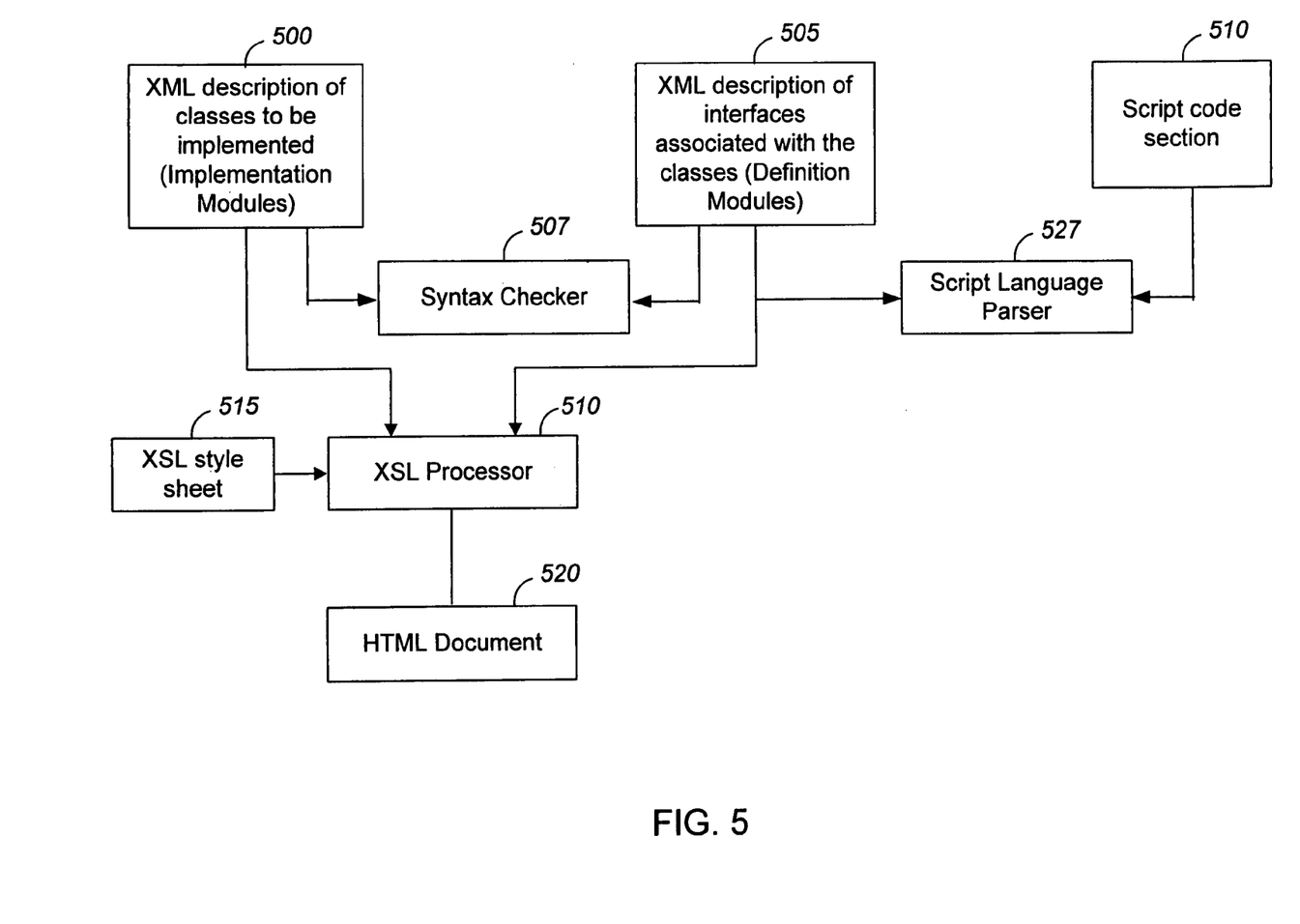
FIG. 5 illustrates the use of definition and implementation modules to validate a program and generate Hypertext Markup Language (HTML) code.

FIG. 5 illustrates use of definition and implementation modules to validate a program and generate HTML code. In FIG. 5, a computer program is represented using a script code section 510 and two XML tree structures 500, 505. The first XML tree structure 500 describes the implementation modules in the form of classes for an HTML document. The second XML tree structure 505 describes definition modules in the form of associated interfaces. The script code section provides the functionality for the HTML document, e.g., support for the scrolling of text. The script code section can be implemented in any scripting language, e.g., JavaScript or Perl. The syntax checker 507 is used to perform a syntax check at the XML level for the implementation modules 500 and the definition modules 505. The HTML document 520 is generated from the implementation modules 500 and the definition modules 505 using the XSL processor 510 in conjunction with XSL style sheets 515. The script language parser 527 performs usage checks by extracting language elements from the script code section 510 and comparing the language elements with the definition modules 505.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

What is claimed is:

1. A method for validating programs, the method comprising steps implemented by one or more computers of:
   receiving a meta-language description of a computer program, the meta-language description comprising a meta-language definition module and a meta-language implementation module, the meta-language implementation module defining a first class to be implemented by the computer program and the meta-language definition module defining a first interface associated with the class;
   validating the meta-language description by validating syntax of the meta-language definition module and syntax of the meta-language implementation module;
   generating a language-dependent program from the meta-language description, the language-dependent program comprising the first interface, the first class, and a script code section written in a scripting language;
   performing usage and semantic checks on the computer program by compiling the generated first interface and the generated first class; and
   performing usage checks on the generated script code section by extracting language elements from the generated script code section and comparing the extracted language elements with the meta-language definition module used to generate the language-dependent program.

2. The method according to claim 1, further comprising:
   generating a compiler language representation of the generated script code section, the compiler language representation of the generated script code section comprising a second interface and a second class.

3. The method according to claim 2, further comprising:
   performing usage and semantic checks on the generated script code section by compiling the compiler language representation of the generated script code section, including the generated second interface and the generated second class.

4. A computer program product, tangibly embodied in a computer-readable storage device, the computer program product comprising instructions operable to cause one or more computers to perform a method comprising:

receiving a meta-language description of a computer program, the meta-language description comprising a meta-language definition module and a meta-language implementation module, the meta-language implementation module defining a first class to be implemented by the computer program and the meta-language definition module defining a first interface associated with the class;

validating the meta-language description by validating syntax of the meta-language definition module and syntax of the meta-language implementation module;

generating a language-dependent program from the meta-language description, the language-dependent program comprising the first interface, the first class, and a script code section written in a scripting language;

performing usage and semantic checks on the computer program by compiling the generated first interface and the generated first class; and performing usage checks on the generated script code section by extracting language elements from the generated script code section and comparing the extracted language elements with the meta-language definition module used to generate the language-dependent program.

5. The computer program product according to claim 4, the method further comprising:

generating a compiler language representation of the generated script code section, the compiler language representation of the generated script code section comprising a second interface and a second class.

6. The method according to claim 5, the method further comprising:

performing usage and semantic checks on the generated script code section by compiling the compiler language representation of the generated script code section, including the generated second interface and the generated second class.

7. An apparatus, comprising:

means for receiving a meta-language description of a computer program, the meta-language description comprising a meta-language definition module and a meta-language implementation module, the meta-language implementation module defining a first class to be implemented by the computer program and the meta-language definition module defining a first interface associated with the class;

means for validating the meta-language description by validating syntax of the meta-language definition module and syntax of the meta-language implementation module;

means for generating a language-dependent program from the meta-language description, the language-dependent program comprising the first interface, the first class, and a script code section written in a scripting language; and means for performing usage and semantic checks on the computer program by compiling the generated first interface and the generated first class, and performing usage checks on the generated script code section by extracting language elements from the generated script code section and comparing the extracted language elements with the meta-language definition module used to generate the language-dependent program, and a programmable processor for implementing at least the means for performing usage checks.

8. The apparatus according to claim 7, further comprising:

means for generating a compiler language representation of the generated script code section, the compiler language representation of the generated script code section comprising a second interface and a second class.

9. The apparatus according to claim 8, wherein the means for performing usage and semantic checks performs usage and semantic checks on the generated script code section by compiling the compiler language representation of the generated script code section, including the generated second interface and the generated second class.

* * * * *

UNITED STATES PATENT AND TRADEMARK OFFICE
CERTIFICATE OF CORRECTION

PATENT NO. : 7,584,457 B2 Page 1 of 1
APPLICATION NO. : 10/676825
DATED : September 1, 2009
INVENTOR(S) : Hammerich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Fourteenth Day of September, 2010

David J. Kappos
*Director of the United States Patent and Trademark Office*